Feb. 20, 1923. Re. 15,548

H. B. BARNES

ELECTRIC SWITCH

Original Filed Dec. 17, 1918

Inventor:
HAROLD B. BARNES,
By John H. Bruninga.
His Attorney.

Reissued Feb. 20, 1923. Re. 15,548

UNITED STATES PATENT OFFICE.

HAROLD B. BARNES, OF DENVER, COLORADO.

ELECTRIC SWITCH.

Original No. 1,287,829, dated December 17, 1918, Serial No. 150,736, filed February 24, 1917. Application for reissue filed October 23, 1919. Serial No. 332,843.

*To all whom it may concern:*

Be it known that I, HAROLD B. BARNES, a citizen of the United States, and residing at Denver, in the county of Denver, Colorado, have invented the new and useful Improvement in Electric Switches, of which the following is a specification.

This invention relates to electric switches and more particularly to switches having audible indicating means of the character described in the copending application filed of even date herewith and bearing Serial No. 332,842, filed October 23, 1919.

In the application referred to is described a switch in which the "on" and "off" positions are indicated audibly. In the specific embodiments described brief audible sounds are produced by reeds which are vibrated either freely or restrained. In practice a bell note is desirable, as the distinctive note or indication persists and continues an appreciable length of time after the operation of the switch and is, therefore, much better than any sound indication which lasts only for a brief interval.

One of the objects of this invention, therefore, is to provide an electric switch of the character described, which has a gong mounted on the base and a striker adapted upon operation of the manipulative element to sound the gong or bell when the switch contacts are shifted.

Another object is to provide a switch of the character described, in which the gong or bell provides a cover or casing for the switch contacts and the striker.

Another object is to provide a switch of the character described in which a series of gongs or bells is provided which gongs or bells are of different pitches or tones corresponding to the different positions of the switch, such as for "off" and "on" positions.

Another object is to improve the construction of the electric switch of the character described having audible indicating means whereby the parts will be effectively insulated and constructed in a simple and efficient manner.

Further objects will appear from the detail description taken in connection with the accompanying drawing, in which.

Figure 1:
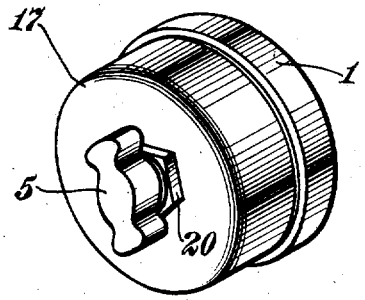
Figure 1 is a perspective view of an electric switch embodying this invention.

Referring to the accompanying drawing, and more particularly to Figures 1 to 5 inclusive, 1 designates the base of an ordinary snap switch which is provided with a stem 2 carrying the usual movable contact element 3 having at its ends contacts which engage cooperating stationary contact elements 4 on the base. The stem carries the usual spring 25 which connects the stem with the movable switch element as is usual in snap switch constructions. A button or manipulative element 5 has a shank 5′ which is threaded on the stem in order that the movable contact element may be shifted to different positions, which in this case are the "on" and "off" positions. The construction so far described is of a well known from and a detail description thereof is unnecessary; suffice it to say that upon manipulation of the button, the spring 25 is tensioned and the switch contacts to "on" and "off" positions with a snap, the switch being shown in "on" position in Figures 2 and 3.

Figure 3:
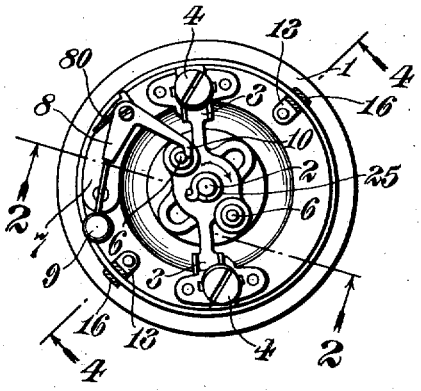
Figure 3 is a section on the line 3—3, Figure 2, showing the cover and insulation removed.
Figure 5:
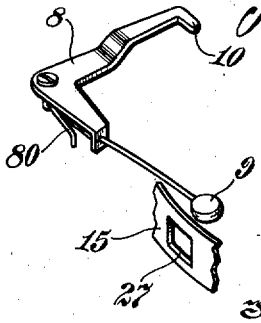
Figure 5 is a detail perspective view of the striker and the insulation.

Mounted on the movable switch element 3 is a pair of tripping posts 6 which are preferably insulated from, but are adapted to move with the element. Mounted on the insulating base 1 is a base plate 7 which is, therefore, insulated from the metallic parts of the switch. Pivotally mounted on the plate 7 is a bell crank lever 8 which is acted upon by a spring 80 tending to move the striker 9 on one arm thereof to the left (Figure 3). The other arm of the bell crank lever terminates in a hook 10 arranged in the path of the tripping posts 6 as the latter rotate with the movable switch element in the direction of the arrow, Figure 3.

A yoke 11 provided with an enlarged perforated portion 12 terminates in feet 13 which are tapped to receive screws 26 for securing the same to the base. Mounted in the center portion 12 of the yoke is a headed and threaded sleeve 14. The yoke supports a circular strip of insulating material 15 which rests on the base and is retained in position by spring fingers 16 mounted on the yoke. The strip of insulating material is perforated as shown at 27 to permit movement therethrough of the striker as hereinafter described. The gong 17 of dished form is supported by the yoke, this gong being perforated to take over the sleeve 14, a washer 19 being interposed between the yoke and the gong, and the whole being secured in position by a nut 20 threaded on the sleeve; accordingly the gong is firmly held in position on the base but free at its outer edge to permit sounding thereof.

In the operation of the switch, movement of the button of manipulative element 5 will cause the switch contacts to move to "off" and "on" positions with a snap. As the movable element moves from "on" position, Figure 3, through a right angle, the tripping posts 6 by engagement with the end 10 of the bell crank lever 8, will move this bell crank lever in counter-clockwise direction, thereby tensioning the spring 80. As the switch element, however, moves to "off" position, the pin 6 will become disengaged from the bell crank lever, thereby tripping it and causing it under the tension of its spring to return and cause the striker 9 to engage and sound the gong 17. When the switch is, however, moved to "on" position, there will be no sound. Accordingly, in accordance with the embodiment described, there will be a distinctive sound when the switch moves to "off" position but no sound when the switch moves to "on" position.

Figure 6:
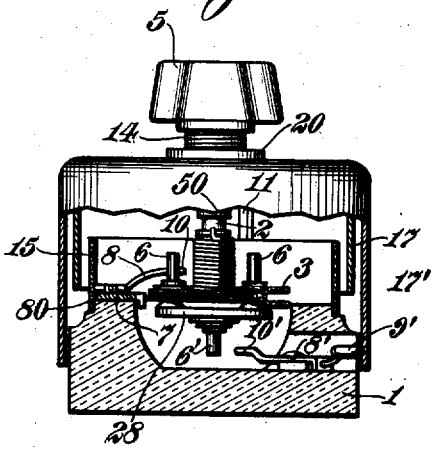
Figure 6 is a view similar to Figure 2, but showing another embodiment of this invention.
Figure 2:
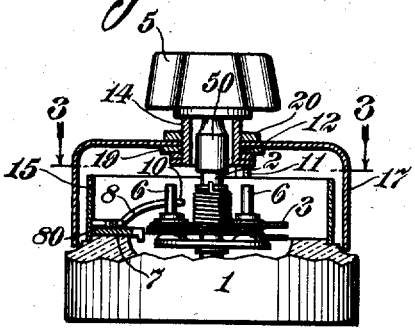
Figure 2 is a longitudinal vertical section taken on the line 2—2, Figure 3.
Figure 4:
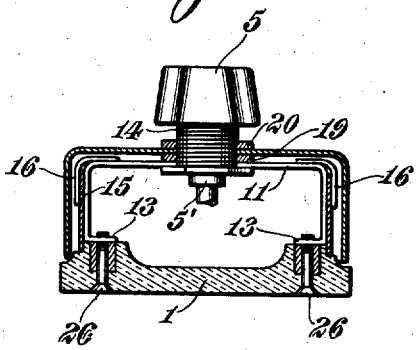
Figure 4 is a section on the line 4—4, Figure 3, with some of the parts removed.

In the embodiment shown in Figure 6, a series of gongs is provided to give distinctive sounds in both "on" and "off" positions of the switch and a striker is provided for each gong in order to sound the same for such positions. Accordingly, the usual connecting element 28 attached to the stem 2 moving therewith and with the movable switch element, has mounted thereon tripping pins 6′ which are, however, arranged on an axis at a right angle to the axis of the tripping pins 6. Arranged in the base is a bell crank lever 8′ having a hook 10′ in the path of the tripping pins 6′, and having a striker 9′ adapted to engage and sound a second gong 17′ of larger diameter and longer than the gong 17 and also supported on the yoke 11. The parts are similar in construction to the corresponding parts heretofore described, and accordingly are designated by corresponding reference characters with the prime added. It will be understood that in view of the different dimensions of the gongs 17 and 17′, their sounds will be distinctively different.

The operation of this embodiment will be obvious from the illustration of the embodiment heretofore described. During the operation of the manipulative element, the gong 17 will be sounded when the switch contacts are moved to "off" position, while the gong 17′ will be sounded when the switch contacts are moved to "on" position. As the gong sounds are distinctively different, the operator can readily determine the shifted position of the switch contacts even though the parts may not be visible.

It will thus be seen that the invention accomplishes its objects. An electric switch is provided which is especially adapted to conditions where the operation of the switch cannot be readily observed visually. Accordingly it is of special utility in electric heaters, fans and remote controlled consuming devices, as the position of the switch contacts is determined audibly. As the gong or bell note is a distinctive note, which persists and continues an appreciable length of time after the operation of the switch, it is obviously much better than a sound indication which is brief.

It is obvious that various changes may be made in the details of construction without departing from the spirit of this invention. It is, therefore, to be understood that this invention is not to be limited to the specific construction shown and described.

Having thus described the invention, what is claimed is:

1. An electric switch of the character described, comprising, a base, switch contacts thereon, a manipulative element adapted to shift said contacts, a gong on said base, a striker mounted on said base, and a spring for said striker, a trigger on said element adapted to tension and then release said striker to sound the gong when the switch contacts are shifted.

2. An electric switch of the character described, comprising, a base, a switch contact thereon, a shiftable manipulative element, a contact thereon adapted to engage said first contact, a gong on said base, a striker mounted on said base, and means on said shiftable element adapted upon movement thereof to operate said striker to sound the gong in order to audibly indicate the shifted relation of said contacts.

3. An electric switch of the character described having a base, switch contacts thereon and a manipulative element adapted to shift the contacts, characterized by the provision of a series of gongs on the base, and means adapted upon operation of the element to selectively sound said gongs.

4. An electric switch of the character described having a base, switch contacts thereon and a manipulative element adapted to shift the contacts, characterized by the provision of a series of gongs on the base, strikers for said gongs, and means adapted upon operation of the element to operate said strikers.

5. An electric switch of the character described having a base, switch contacts thereon movable to different selected positions and a manipulative element adapted to shift the contacts, characterized by the provision of a series of gongs of different pitches on the base, and means adapted upon operation of the element to sound a selected gong when the contacts are shifted to a selected position.

6. An electric switch of the character described having a base, switch contacts thereon movable to different selected positions and a manipulative element adapted to shift the contacts, characterized by the provision of a series of gongs of different pitches on the base, strikers for said gongs, and means adapted upon operation of the element to actuate a selected striker in order to sound a selected gong when the contacts are shifted to a selected position.

7. An electric switch of the character described having a base, switch contacts thereon movable to different selected positions and a manipulative element adapted to open and close the contacts, characterized by the provision of tripping mechanism co-operating with and adapted upon movement of the element to selectively indicate audibly when the switch contacts are opened or closed.

8. An electric switch of the character described having a base, switch contacts thereon and a manipulative element adapted to open and close the contacts, characterized by the provision of gongs on the base corresponding in pitch to the open and closed positions of the contacts, and mechanism adapted upon movement of the element to selectively sound said gongs when the contacts are opened or closed.

9. An electric switch of the character described having a base, switch contacts thereon and a manipulative element adapted to shift the contacts, characterized by the provision of a gong on the base, a striker adapted upon operation of the element to sound the gong when the switch contacts are shifted, and an insulating element between said gong and the contacts.

10. An electric switch of the character described having a base, switch contacts thereon and a manipulative element adapted to shift the contacts, characterized by the provision of a dished gong on the base adapted to form a cover for the contacts and through which the element projects, a striker adapted upon operation of the element to sound the gong when the switch contacts are shifted, and an insulating element between said gong and the contacts and having a recess for said striker.

11. In an audible indicating device, the combination with a base, of a supporting yoke mounted on said base, a rotatable post suspended therefrom, tripping-posts carried thereby, trip-actuated means mounted on said base and adapted to be actuated by said tripping-posts, a bell-cover mounted on said yoke and surrounding mechanism of said device adapted to be struck by said trip-actuating mechanism upon the actuation of said rotatable post.

12. In an audible indicating device, the combination with a base, of a supporting yoke mounted on said base, a rotatable post suspended therefrom, a circuit-making means carried by said post, trip-posts mounted on said circuit-making means, trip-actuated means mounted on said base adapted to be actuated by said trip-post, a bell-cover mounted on said yoke and surrounding the mechanism of said switch adapted to be struck by said trip-actuating means upon the actuation of said rotatable post.

13. In an audible indicating device, the combination with a base, of a supporting yoke mounted on said base, a rotatable post suspended therefrom, circuit-making means carried by said post, trip-posts mounted on said circuit-making means, trip-actuated means mounted on said base adapted to be actuated by said trip-post, an insulating band provided with an orifice surrounding said mechanism and supported by said yoke, a bell covering mounted on said yoke and surrounding the mechanism of said switch, adapted to be struck by said trip-actuating means upon the actuation of said rotatable post.

14. In an audible indicating device, the combination with a base, of a rotatable post mounted thereon, circuit-making means carried by said post, tripping posts mounted on said circuit-making means, a plate mounted on the base, a lever pivotally mounted on said plate, one end of the lever provided with a hook and the other with a hammer, and a bell cover mounted upon the base and surrounding the upper part of the switch, adapted to be struck by said hammer upon the actuation of the rotatable post and the consequent tripping of the hook on said lever by said tripping post.

Signed at Denver, in the county of Denver, State of Colorado, this 23rd day of Aug., 1919.

HAROLD B. BARNES.